2,289,286

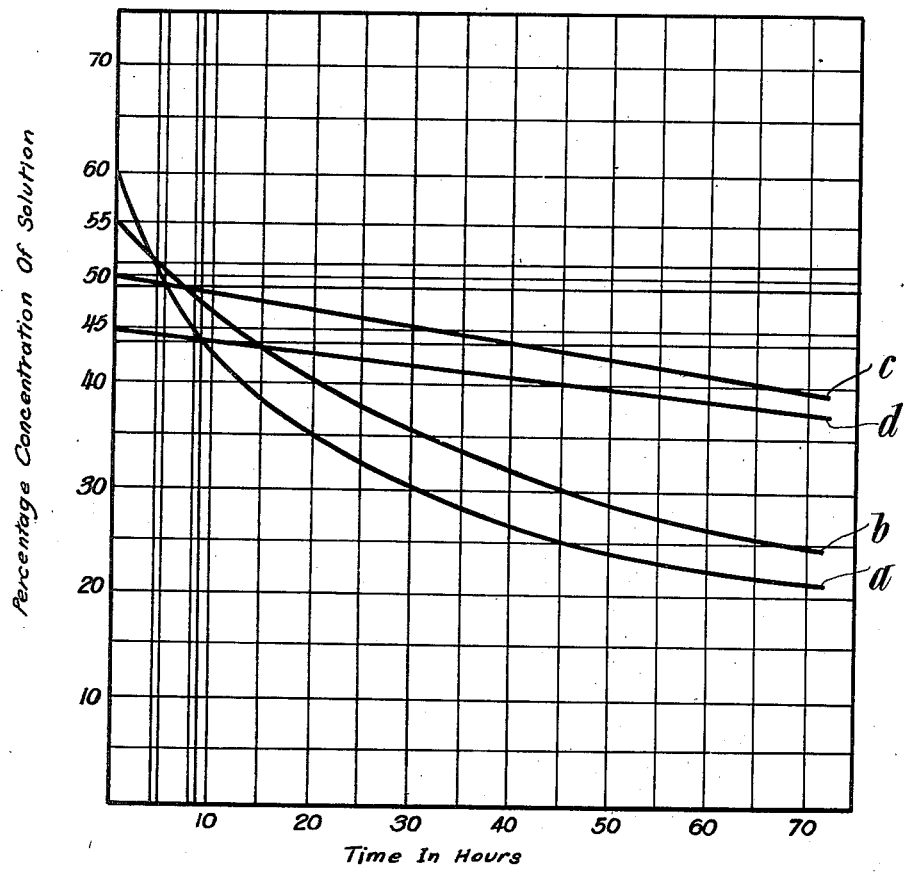
Curves a, b, c And d Respectively Represent The Rate At Which Solutions Of Original Concentrations Of About 60, 55, 50, 45 And 40 Percent Of $Al(HCOO)_3 \cdot 3H_2O$ Deposit Crystalline Aluminium Triformate At About 40°–45° C. During The Hours Indicated
INVENTOR:
EDMOND MAZABRAUD Patented July 7, 1942

UNITED STATES PATENT OFFICE 2,289,286

PROCESS FOR THE MANUFACTURE OF HYDRATED ALUMINUM TRIFORMATE

Edmond Mazabraud, Bron, near Lyon, France, assignor to Societe Normande de Produits Chimiques, Paris, France, a company of France Application October 4, 1940, Serial No. 359,739
In France September 22, 1939

7 Claims. (Cl. 260—448)

The present invention relates to a process for the manufacture of hydrated aluminum triformate in a solid form.

For a long time formate of aluminum was only known in solution and the first attempt which was made to obtain this product in the solid state consisted in evaporating carefully on the water bath a solution of moist aluminum hydroxide in concentrated formic acid. The product obtained, of which the aluminum content corresponded to an anhydrous aluminum triformate, was not stable in aqueous solution (German Patent 224,074).

It was then proposed to evaporate under reduced pressure (20 mm.) at a moderate temperature (35 to 40° C.) and on large surfaces, solutions of aluminum formate (French Patent 435,446). There was thus obtained the hydrated aluminum triformate Al(HCOO)$_3$.3H$_2$O, but this process necessitated the use of a special particular apparatus and a considerable cost of fuel and power.

It was then proposed to leave standing for a long time at ordinary temperature aqueous solutions of aluminum formate of a specific gravity of at least 1,100, and eventually to promote the separation of crystals by the addition of small quantities of the desired crystalline aluminum salt as a seeding substance. This process is based on the fact that solutions of aluminum formate easily show the phenomenon of super-saturation.

Now this property of solutions of aluminum formate has been known for a long while, having been described for the first time in German Patent 252,833. The description in this patent also mentions that in solutions of aluminum formate there is frequently produced by prolonged storage a separation of formate.

In any case, it is only at the end of a prolonged time that in these known processes the aluminum triformate is deposited in the cold from super-saturated solutions, even when these are seeded by means of a solid charge.

According to the present invention it has been found that if solutions of aluminum formate of concentration greater than 50% by weight of Al(HCOO)$_3$.3H$_2$O are prepared in the hot, these yield rapidly in the course of cooling large quantities of hydrated aluminum formate, with or without seeding. Furthermore it is not necessary to push the cooling down to the attainment of ordinary temperature, the deposit of crystalline product is already abundant and technically significant even while maintaining the solution at a temperature of 40–45° in the course of crystallisation.

The accompanying graph illustrates the relationship of the concentration of solutions of aluminum triformate to the rate of deposition of the crystalline salt at temperatures of about 40° to 45° C.

In this graph there are shown the results of a series of tests in which solutions of aluminum formate of concentration respectively of 45, 50, 55, and 60% (by weight) expressed in crystallised product are caused to crystallise at 40–45° C. Samples of mother liquor were taken periodically and the content thereof has been expressed in terms of the crystalline product. Curves have been constructed showing these contents as a function of the time. As spontaneous crystallisation of the solutions of 45 and 50% is only very slow, it was necessary to seed these with the solid product and in order to have comparable values for the four tests one seeded in the same manner (namely with 1% of the total content) the solutions of 55 and 60% (practically in the solutions of 55% and over the super-saturation disappears very rapidly).

The examination of the accompanying graph shows the extremely favourable direction taken by the curve when the initial concentration begins to exceed 50%. For concentration below this amount the content of the mother liquors falls slowly, yielding a small deposit of crystals. For higher concentrations, for example 60%, the content of the mother liquors on the contrary falls extremely quickly at the start, and at the end of about 13 hours attains the same value (40%) (curve $a$) as that which is only attained in the case of solutions of 50% after 65 hours (curve $c$).

The preparation of the very concentrated solutions for carrying the present invention into effect is most advantageously done by dissolving dry aluminum hydroxide Al(OH)$_3$ in formic acid to which has been added the quantity of water required for obtaining the desired concentration. The equation for the reaction:

$$Al(OH)_3 + 3HCOOH = Al(HCOO)_3.3H_2O$$

shows that when formic acid of high concentration is employed the reagents do not introduce any more water than that which corresponds to the water of hydration of the crystallised aluminum triformate. The use of aluminum hydroxide and of formic acid therefore permits the preparation of solutions of any desired concentration.

The solution is carried out by introducing the aluminum hydroxide little by little into formic acid of the desired concentration. The reaction is exothermic and it is necessary to moderate it so that the temperature does not exceed 50° C., above which temperature there is risk of causing hydrolysis which leads to the formation of basic salt. For this purpose one can cool the dissolving apparatus or regulate the addition of aluminum hydroxide so that the temperature remains in the neighbourhood of 50°.

The product finally obtained is produced in the form of a white crystalline powder entirely soluble in water.

The present invention represents an important technical advance in comparison with previous processes. It permits in effect a more rapid production in a simpler apparatus. Further it could not have been foreseen that solutions of aluminum formate, the instability of which in the hot is well known, would allow themselves to deposit in the hot a product identical with that obtained by the previous processes, either by evaporation in a vacuum at a temperature below 40° or by crystallisation at ordinary temperature.

What I claim and desire to secure by Letters Patent is:

1. Process for the production of crystalline aluminum triformate, $Al(HCOO)_3.3H_2O$, comprising the steps of dissolving in aqueous formic acid solution, of high concentration, a quantity of aluminum hydroxide sufficient to neutralize the said acid, at a temperature not exceeding approximately 50° C., to inhibit any substantial formation of basic salt, then permitting the resulting solution to deposit crystalline aluminum triformate, and separating the latter from the residual mother liquor.

2. Process for the production of crystalline aluminum triformate, $Al(HCOO)_3.3H_2O$, comprising the steps of gradually adding to an aqueous formic acid solution, of high concentration, a quantity of aluminum hydroxide sufficient to neutralize the said acid and at a rate which will prevent the exothermic heat of the reaction from raising the temperature of the solution above 50° C., then permitting the resulting solution to deposit crystalline aluminum triformate, and separating the latter from the residual mother liquor.

3. Process for the production of crystalline aluminum triformate, $Al(HCOO)_3.3H_2O$, comprising the steps of dissolving in aqueous formic acid solution, of high concentration, a quantity of aluminum hydroxide sufficient to neutralize the said acid, at a temperature not exceeding approximately 50° C., to inhibit any substantial formation of basic salt, then keeping the resulting solution at a temperature of about 40° C. to 45° C. while it deposits crystalline aluminum triformate, and separating the latter from the residual mother liquor.

4. Process for the production of crystalline aluminum triformate, $Al(HCOO)_3.3H_2O$, comprising the steps of adding dry aluminum hydroxide to an aqueous solution of formic acid of high concentration, gradually and at a rate to prevent the temperature of the reaction mixture from rising above 50° C. and in sufficient proportion of each reactant to form a solution having a concentration of at least sixty percent by weight of $Al(HCOO)_3.3H_2O$, then permitting the resulting solution to deposit crystalline aluminum triformate, and separating the latter from the residual mother liquor.

5. Process for the production of crystalline aluminum triformate, $Al(HCOO)_3.3H_2O$, comprising the steps of adding dry aluminum hydroxide to an aqueous solution of formic acid of high concentration, gradually and at a rate to prevent the temperature of the reaction mixture from rising above 50° C. and in sufficient proportion of each reactant to form a solution having a concentration of at least sixty percent by weight of $Al(HCOO)_3.3H_2O$, then keeping the resulting solution at a temperature of about 40° C. to 45° C. while it deposits crystalline aluminum triformate, and separating the latter from the residual mother liquor.

6. Process for the production of crystalline aluminum triformate, $Al(HCOO)_3.3H_2O$, which comprises reacting aluminum hydroxide with aqueous solution of formic acid in calculated proportions and in such sufficient quantities of each of the reactants to produce a solution of aluminum triformate in high concentration with the aid of the exothermic heat of the reaction, and under conditions to avoid a rise of temperature in excess of 50° C., then permitting the resulting solution to deposit crystalline aluminum triformate without any artificial depression of the temperature, and separating the said triformate from the residual mother liquor.

7. Process for the production of crystalline aluminum triformate, $Al(HCOO)_3.3H_2O$, comprising the steps of gradually adding to an aqueous formic acid solution, of high concentration, a quantity of aluminum hydroxide sufficient to neutralize the said acid and at a sufficiently slow rate which will prevent the exothermic heat of the reaction from raising the temperature of the solution to a point at which substantial hydrolysis of the formed aluminum triformate will be effected.

EDMOND MAZABRAUD.